United States Patent [19]
Decker

[11] Patent Number: 5,899,536
[45] Date of Patent: May 4, 1999

[54] TIRE CHAIN WRAPPER

[76] Inventor: Emil Decker, 921 N. 10th St., Kansas City, Mo. 66111-1921

[21] Appl. No.: 08/964,921

[22] Filed: Nov. 5, 1997

[51] Int. Cl.$^6$ ...................................................... B60B 15/00
[52] U.S. Cl. ......................................... 301/42; 152/213 R
[58] Field of Search .............................. 152/213 R, 220, 152/231, 221, 217, 222

[56] References Cited

U.S. PATENT DOCUMENTS

| | | | |
|---|---|---|---|
| 1,767,366 | 6/1930 | Jackson et al. | 152/220 |
| 1,848,444 | 12/1930 | Tully . | |
| 2,557,241 | 6/1951 | Silver | 152/220 |
| 3,547,177 | 12/1970 | Vally | 152/220 |
| 3,581,797 | 6/1971 | Kinnucan | 152/220 |
| 3,750,734 | 8/1973 | McCord . | |

FOREIGN PATENT DOCUMENTS

| | | | |
|---|---|---|---|
| 552651 | 6/1932 | Germany | 152/220 |
| 909897 | 6/1949 | Germany | 152/213 R |
| 971551 | 2/1959 | Germany | 152/220 |
| 309755 | 1/1956 | Switzerland | 152/213 R |

*Primary Examiner*—D. Glenn Dayoan
*Assistant Examiner*—Long Bao Nguyen
*Attorney, Agent, or Firm*—Chase & Yakimo, L.C.

[57] ABSTRACT

A tire chain wrapper for a dual wheel and the method of mounting a tire chain on a dual wheel. The wrapper includes a securing bar for securing an end of the tire chain to the dual wheel, a connecting rope pivotally attached at one end to the midpoint of the securing bar, the rope being adapted to extend between the tires of the dual wheel and a rigid plastic retaining disk attached to another end of the connecting rod and being adapted to engage the wheel rims and thereby retain the securing bar over the tire chain. After installation of the wrapper, the vehicle is driven forward to wrap the chain around the tire. The ends of the chain are hooked together, and the tire chain wrapper is removed from the tire.

9 Claims, 1 Drawing Sheet

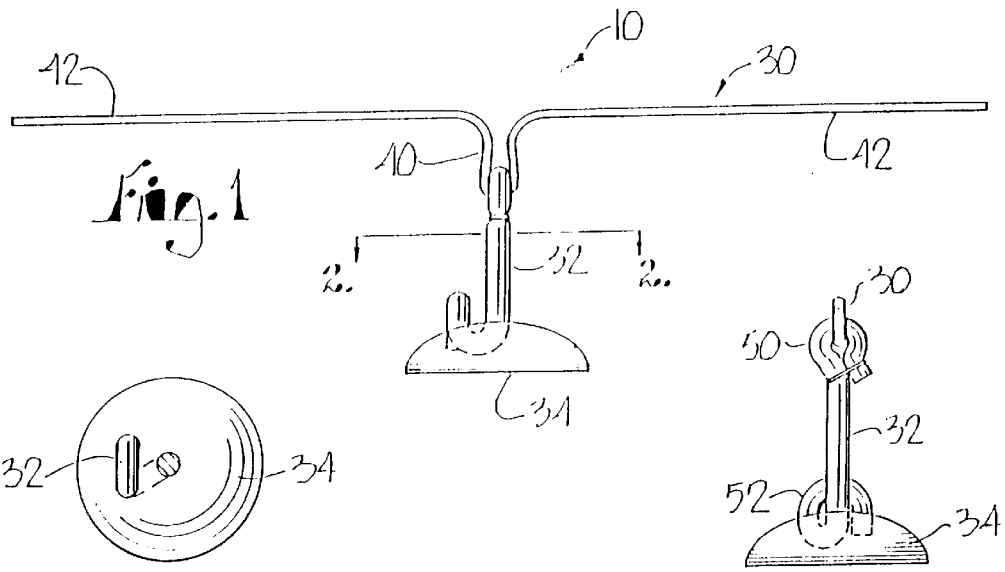
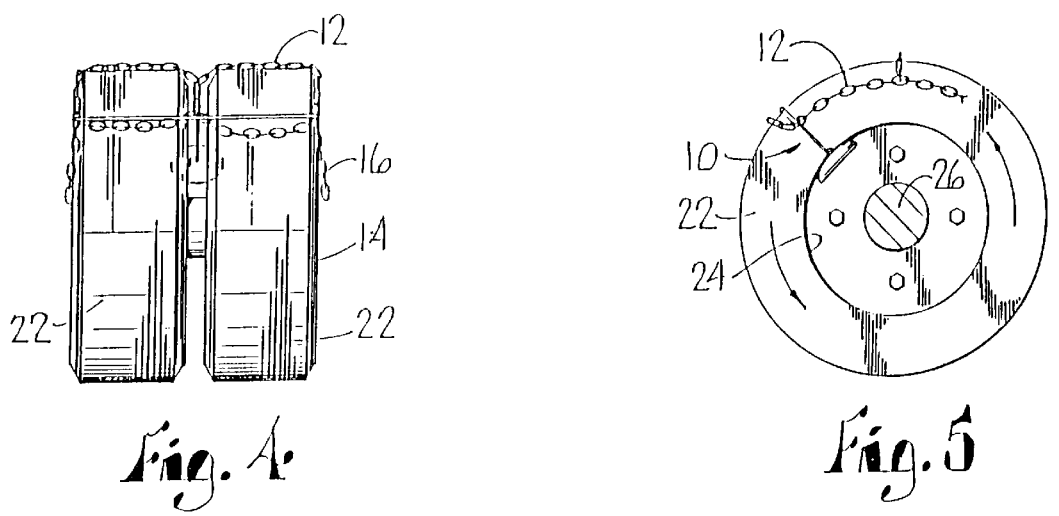
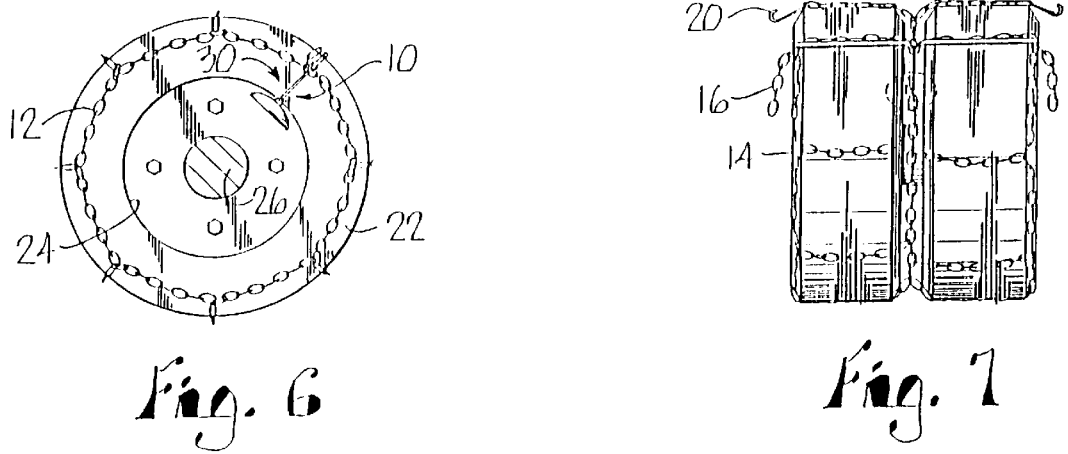

TIRE CHAIN WRAPPER

BACKGROUND OF THE INVENTION

This invention pertains to a tire chain wrapper or applicator and, more particularly, to a tire chain wrapper for applying chains to dual wheels during or in anticipation of poor road and weather conditions.

Devices to aid in the application of tire chains to dual wheels are known. One such device includes a tubular member with protruding hooks which are threaded through an aperture in the truck wheels and an end of the chain is hooked thereto. The hooks extend from the inside of the wheel and between the tires to which one end of the tire chain is attached. The hooks hold the chain in place as the tires are rotated until the other end of the chain can be attached to the first end. Such devices can be difficult to install under poor lighting and weather conditions.

SUMMARY OF THE INVENTION

Accordingly, a primary object of the subject invention is to provide a tire chain wrapper or applicator for a dual wheel that includes a securing bar adapted to secure an end of the chain to the dual wheel and a retaining member connected to the securing bar which extends between the tires and secures the bar over the tires by engaging the wheel rims thereof.

Another object of the subject invention is to provide an easy, efficient method of mounting a dual wheel tire chain using a tire chain wrapper as herein discussed.

Another object of the subject invention is to provide a tire chain applicator that requires only one hand installation.

Still another object of the subject invention is to provide a tire chain applicator that easily and quickly secures the chain over the tires of dual wheels.

Yet another object of the subject invention is to provide a tire chain wrapper that maintains the chain position while hooking the ends thereof together.

These objects are attained by providing a tire chain applicator for a dual wheel comprising a securing bar for securing an end of the tire chain to the dual wheel, a flexible and preferably stretchable connecting rope pivotally attached at one end to the midpoint of the securing bar, the rope being adapted to extend between the tires of the dual wheel, and a rigid retaining disk preferably formed of plastic attached to another end of the connecting rod and being adapted to engage the wheel rims and retain the securing bar over the tire chain. These objects are also attained by providing the method of mounting a tire chain on a dual wheel using the device described herein.

BRIEF DESCRIPTION OF THE DRAWINGS

FIG. 1 is a front view of a tire chain wrapper in accordance with the present invention.

FIG. 2 is a sectional view taken along line 2—2 of the tire chain wrapper of FIG. 1.

FIG. 3 is a side view of the tire chain wrapper of FIG. 1.

FIG. 4 is a front view of the tire chain wrapper of FIG. 1 secured over an end of a tire and being mounted over a dual wheel.

FIG. 5 is a right side view in section through the wheel's axis of the tire chain wrapper of FIG. 4 and showing the direction of the tire rotation during installation of the chain.

FIG. 6 is similar to FIG. 5 but shows the tire chain wrapper and chain installed after rotation of the tires.

FIG. 7 is a front view of the tire chain wrapper and chain as installed and shown in FIG. 6.

DETAILED DESCRIPTION

Tire chain wrapper 10 in accordance with the present invention is shown in FIGS. 1–3. Tire chain wrapper 10 secures an end of a tire chain 12 over the tires of dual wheel 14 for easy installation of the chain 12 as seen in FIGS. 4–7. The tire chain 12 and the dual wheel 14 are conventional. As shown, the tire chain 12 includes opposed first and second ends 16 and 18 with hooks 20 attached at the second end 18 for securing the ends 16 and 18 together. Dual wheel 14 typically includes opposed tires 22 mounted on wheel rims 24 about axle 26.

As best seen in FIGS. 1–3, the tire chain wrapper 10 includes securing bar 30, and connecting rope 32 and plastic disk 34 which present a retaining member that secures securing bar 30 over the first end 16 of the tire chain 12. See FIGS. 4 and 5. Securing bar 30 includes a U-shaped joint 40 preferably formed at the midpoint of bar 30 with opposed arms 42 extending horizontally outwardly therefrom. With joint 40 at the midpoint of bar 30, arms 42 are of equal length. Bar 30 is rigid and preferably formed of steel.

Connecting rope 32 includes an end 50 that presents an eye pivotally attached at joint 40 of securing bar 30 and a second opposite end 52 fixedly attached to disk 34. Rope 32 is resiliently flexible and stretchable, preferably formed of rubber. It extends vertically downwardly from securing bar 30 to disk 34. Although fixedly attached to disk 34, end 52 is removable therefrom for adjusting the length of the rope 32 and thus the distance between the securing bar 30 and disk 34. The end 52 is weaved through the disk 34 as seen in FIGS. 1–3 to removably fix the disk 34 at the end 52 of the rope 32.

Disk 34 is preferably concave, approximately ¼" thick, circular and formed of rigid plastic. Disk 34 is securely attached to the second end 52 of rope 32 and extends horizontally outwardly therefrom in spaced apart, parallel relation to the securing bar 30. The disk 34 includes three apertures extending therethrough in a triangular configuration which receive the second end 52 of the rope 32 to secure the disk 34 to the rope 32 as seen in FIGS. 1–3.

As shown, disk 34 is circular. It may, however, be shaped so as to not have a constant diameter or length to allow use of the same disk with different types of wheel rims. Instead, for example, disk 34 could be oval shaped having two lengths to correspond to the distance that different types of wheel rims are spaced apart.

In operation, the length of the rope 32 is adjusted by weaving more or less of the rope 32 through the apertures in the disk 34 at the rope's second end 52 as needed depending on the distance from the outer or tread surface of the tires 22 to the wheel rims 24 and the tension needed to hold the securing bar 30 over the chain 12. The tire chain 12 is mounted on the dual wheel 14 by placing the first end 16 of the chain 12 over the top portion of the dual wheel tires 22, as shown in FIGS. 4 and 5. More specifically, the chain's first cross-links are generally between the ten and eleven o'clock positions.

The tire chain wrapper 10 is mounted over the first end 16 of the tire chain 12 to secure the tire chain 12 to the tires 22. The flexible nature of the rope 32 allows the plastic disk 34 to be inserted between the first and second set of cross-links on chain 12 and between the tires 22 of dual wheel 14 immediately beneath the wheel rims 24. The securing bar 30 is pulled outward from between the tires 22 to snugly lock the disk 34 in place against and immediately beneath the rims 24. The rope 32 stretches between the tires 22 placing tension on the bar 30 over the chain 12 to secure the tire chain wrapper 10 over the chain 12.

The tires 22 are rotated as shown in FIG. 5 by driving the truck (or other vehicle) forward to wrap the chain 12 around the tires 22 until the securing bar 30 is in approximately the two 'clock position, as in FIGS. 6 and 7. The second end 18 of the chain 12 can be easily attached by hooks 20 to the first end 16 thereof to secure the chain 12 over the tires 22. Tire chain wrapper 10 is removed from dual wheel 14 by pivoting securing bar 30 out of engagement with the chain 12 and tires 22 and dislodging or unsnapping the disk 34 from beneath the wheel rims 24 via flexible rope 32.

Of course, a plurality of tire chain wrappers 10 may be used on different wheels to install chains simultaneously around the wheels of a vehicle as desired.

Tire chain wrapper 10 thereby provides an easy, efficient device and method for installing tire chains over dual wheels in poor road and weather conditions.

Having thus described the invention, what is claimed as new and desired to be secured by Letters Patent is as follows:

1. A tire chain wrapper for a dual wheel, comprising:
   a securing bar for securing an end of the tire chain to the dual wheel;
   an elastic connecting member having first and second ends, having a length less than the distance from a wheel rim to an outer surface of the dual wheel and being pivotally attached at said first end to said securing bar, said member adapted to extend between tires of the dual wheel; and
   a retaining member attached to said second end of said connecting member, adapted for insertion between the dual wheel tires to engage wheel rims of the dual wheel and retain said securing bar over the tire chain.

2. A tire chain wrapper for a dual wheel as claimed in claim 1 wherein said connecting member is pivotally attached to said securing bar at a midpoint thereof.

3. A tire chain wrapper for a dual wheel as claimed in claim 6 wherein said retaining member is rigid plastic.

4. A tire chain wrapper for a dual wheel as claimed in claim 2 wherein said retaining member is disk-like.

5. A method of mounting a tire chain on a dual wheel of a vehicle comprising the steps of:
   placing a first end of the tire chain over the top portion of the dual wheel tires;
   mounting a tire chain applicator over the first end of the tire chain to secure the tire chain to the tires, including inserting a retaining member of the tire chain applicator attached to an end of a connecting member between the dual wheel tires and securing a bar connected to the connecting member opposite the retaining member over the first end of the tire chain;
   driving the vehicle forward to wrap the chain around the tires;
   securing a second end of the chain to the first end thereof; and
   removing the tire chain wrapper, including relaxing the connecting member and withdrawing the retaining member out between the dual wheel tires.

6. A tire chain wrapper as claimed in claim 4 wherein said retaining member has two diameters, being adapted to engage a variety of wheel rims.

7. The method of claim 5 wherein the connecting member is elastic and the mounting step includes adjusting the length of the connecting member to be less than or substantially equal to the radius of the tires.

8. The method of claim 5 wherein the connecting member is elastic and the mounting step includes tensioning the connecting member until the member's length is greater than the radius of the tires, releasing the bar over the first end of the chain, the connecting member contracting to secure the bar thereover.

9. A method of mounting a tire chain on a dual wheel of a vehicle comprising the steps of:
   placing a first end of the tire chain over the top portion of the dual wheel tires;
   mounting a tire chain applicator over the first end of the tire chain to secure the tire chain to the tires, including adjusting the length of an elastic connecting member of the tire chain applicator to be less than the distance from a wheel rim to an outer surface of dual wheel tire, inserting a retaining member attached to an end of the connecting member between the dual wheel tress, tensioning the connecting member until the member extends beyond the outer surface of the tire and releasing a securing bar connected to the connecting member opposite the retaining member over the first end of the chain, the connecting member contracting to secure the bar thereover,
   driving the vehicle forward to wrap the chain around the tires;
   securing a second end of the chain to the first and thereof;
   removing the tire chain wrapper, including relaxing the connecting member and withdrawing the retaining member out between the dual wheel tires.

* * * * *

UNITED STATES PATENT AND TRADEMARK OFFICE
CERTIFICATE OF CORRECTION

PATENT NO. : 5,899,536
DATED : May 4, 1999
INVENTOR(S) : Emil Decker

It is certified that error appears in the above-identified patent and that said Letters Patent is hereby corrected as shown below:

On the titl page,

In the inventor's address, delete "Missouri" and substitute --Kansas--.

In the Abstract, line 2, after "wheel", insert --using the device described herein--.

Column 4, line 37, delete "tress" and substitute --tres--.

Signed and Sealed this

Twenty-sixth Day of October, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,899,536
DATED : May 4, 1999
INVENTOR(S) : Emil Decker

It is certified that error appears in the above-identified patent and that said Letters Patent is hereby corrected as shown below:

Column 4, line 37, delete "trees" and substitute --tires--.

Signed and Sealed this

Sixteenth Day of May, 2000

Attest:

Q. TODD DICKINSON

*Attesting Officer*          *Director of Patents and Trademarks*